(12) United States Patent
Arai et al.

(10) Patent No.: US 12,270,899 B2
(45) Date of Patent: Apr. 8, 2025

(54) TRAJECTORY ESTIMATION DEVICE, TRAJECTORY ESTIMATION SYSTEM, TRAJECTORY ESTIMATION METHOD, AND PROGRAM RECORDING MEDIUM

(71) Applicant: NEC Corporation, Tokyo (JP)

(72) Inventors: Yumi Arai, Tokyo (JP); Reishi Kondo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 190 days.

(21) Appl. No.: 17/800,145

(22) PCT Filed: Mar. 10, 2020

(86) PCT No.: PCT/JP2020/010269
§ 371 (c)(1),
(2) Date: Aug. 16, 2022

(87) PCT Pub. No.: WO2021/181517
PCT Pub. Date: Sep. 16, 2021

(65) Prior Publication Data
US 2023/0071304 A1    Mar. 9, 2023

(51) Int. Cl.
*G01S 15/58* (2006.01)
*G01S 7/536* (2006.01)

(52) U.S. Cl.
CPC ............ *G01S 15/586* (2013.01); *G01S 7/536* (2013.01)

(58) Field of Classification Search
CPC ........ G01S 15/586; G01S 7/536; G01S 3/808; G01S 3/8022; G01S 5/18;
(Continued)

(56) References Cited

U.S. PATENT DOCUMENTS 5,241,518 A      8/1993   McNelis et al.
11,711,648 B2 *  7/2023   Lopatka .................. G10L 25/30
                                                                381/92
(Continued)

FOREIGN PATENT DOCUMENTS

JP      H05-087903 A    4/1993
JP      H07-505219 A    6/1995
(Continued)

OTHER PUBLICATIONS

JP-2000205794-A (machine translation) (Year: 2000).*
(Continued)

*Primary Examiner* — Luke D Ratcliffe
*Assistant Examiner* — Christopher Richard Walker

(57) ABSTRACT

A trajectory estimation device that includes an acquisition unit that acquires wave data based on a wave detected by a plurality of sensors; a generation unit that generates a spectrogram using the wave data; an extraction unit that extracts a Doppler shift from the spectrogram; a selection unit that selects, as a sensor pair, two of the sensors that satisfy a preset selection condition for the Doppler shift; and an estimation unit that estimates a trajectory of a wave source, which is a source generating the wave, based on a positional relationship between the sensors constituting the sensor pair and a relationship of the Doppler shifts between the two sensors constituting the sensor pair.

9 Claims, 14 Drawing Sheets

(58) Field of Classification Search
CPC ........ H04R 2201/405; H04R 2201/403; H04R 2430/30; H04R 1/405
See application file for complete search history.

(56) References Cited

U.S. PATENT DOCUMENTS

| | | | | |
|---|---|---|---|---|
| 2007/0033045 | A1* | 2/2007 | Smaragdis | G10L 21/028 704/E21.013 |
| 2011/0110195 | A1* | 5/2011 | Hall | G01S 3/8083 367/118 |
| 2013/0010968 | A1* | 1/2013 | Yagi | G10L 21/028 381/17 |
| 2017/0016983 | A1* | 1/2017 | Hoshuyama | G01S 7/354 |

FOREIGN PATENT DOCUMENTS

| | | | |
|---|---|---|---|
| JP | 2000205794 A | * | 7/2000 |
| JP | 2007-033445 A | | 2/2007 |
| JP | 2015-118004 A | | 6/2015 |

OTHER PUBLICATIONS

Gupta et al. ("Motion parameter estimation of a radiating point source with multiple tonals using acoustic Doppler analysis," 2013 IEEE International Underwater Technology Symposium (UT), Tokyo, Japan, 2013, pp. 1-6) (Year: 2013).*

Parsayan ("High speed sound source detection based on ADFSD measurement," 2013 9th International Conference on Information, Communications & Signal Processing, Tainan, Taiwan, 2013) (Year: 2013).*

Barnwal et al. ("Doppler based speed estimation of vehicles using passive sensor," 2013 IEEE International Conference on Multimedia and Expo Workshops (ICMEW), San Jose, CA, USA, 2013, pp. 1-4) (Year: 2013).*

International Search Report for PCT Application No. PCT/JP2020/010269, mailed on Jun. 30, 2020.

English translation of Written opinion for PCT Application No. PCT/JP2020/010269, mailed on Jun. 30, 2020.

* cited by examiner

TRAJECTORY ESTIMATION DEVICE, TRAJECTORY ESTIMATION SYSTEM, TRAJECTORY ESTIMATION METHOD, AND PROGRAM RECORDING MEDIUM

This application is a National Stage Entry of PCT/JP2020/010269 filed on Mar. 10, 2020, the contents of all of which are incorporated herein by reference, in their entirety.

TECHNICAL FIELD

The present invention relates to a trajectory estimation device or the like that estimates a trajectory of a moving wave source.

BACKGROUND ART

By using a microphone array including a plurality of microphones, a direction of a sound source can be estimated by an arrival time difference of sound waves emitted from the sound source. For example, when a position of the sound source at regular time intervals is regarded as stationary, a position of a moving sound source can be estimated. In estimation of a sound source direction using a general microphone array, in order to avoid spatial aliasing distortion, a distance between microphones constituting the microphone array is set to be smaller than a value obtained by dividing a sound speed by twice a frequency of a sound wave. In a case where the sound source moves, a plurality of such microphone arrays are installed in a wide range.

PTL 1 discloses a bullet position locating device that estimates a falling position and the like of a high-speed flying object such as a bullet. A device of PTL 1 estimates the falling position and the like of the high-speed flying object based on an arrival time difference of a projectile firing sound and the like observed by a plurality of sensors. In a method of PTL 1, a projectile firing position is estimated by using a Doppler shift of a flight sound of the projectile at the position of the sensor calculated by using an optimum ballistic calculation value calculated in advance.

PTL 2 discloses a method for determining a trajectory of a supersonic projectile of which a velocity and a direction are unknown. In the method of PTL 2, shock waves generated by the supersonic projectile passing near at least three sensors disposed at intervals on the same plane are observed by the sensors. Each sensor outputs a signal related to an azimuth angle and an elevation angle of a unit aiming vector to a shock wave source in response to the shock wave. In the method of PTL 2, the azimuth angle and the elevation angle of a local trajectory of the projectile are calculated from the unit aiming vectors of the three sensors.

CITATION LIST

Patent Literature

[PTL 1] JP 2000-205794 A
[PTL 2] JP 7-505219 T

SUMMARY OF INVENTION

Technical Problem

In estimation of a sound source direction using a general microphone array, in a case where the sound source moves, a plurality of microphone arrays are installed in a wide range, in such a way that a large number of microphones are required and the cost is increased. In the estimation of the sound source direction using the general microphone array, since a section in which a position of the sound source can be regarded as stationary is short, a sufficient amount of data for the estimation cannot be obtained, and an estimation accuracy decreases.

In the method of PTL 1, in order to estimate an accurate projectile firing position, a final projectile firing position is estimated by repeating a ballistic calculation and a calculation of a Doppler shift value of a flight sound. In the method of PTL 1, since the position cannot be specified following the movement of the wave source, it is not possible to estimate a temporal change or velocity (hereinafter, referred to as a trajectory) of the position of the wave source.

The method of PTL 2 can be applied to calculation of a trajectory of a mobile body that moves at a supersonic speed enough to generate a shock wave. However, the method of PTL 2 cannot calculate the trajectory of the wave source based on the wave from the wave source moving at a velocity at which no shock wave is generated.

An object of the present invention is to provide a trajectory estimation device and the like capable of estimating a trajectory of a moving wave source.

Solution to Problem

A trajectory estimation device according to an aspect of the present invention including an acquisition unit that acquires wave data based on a wave detected by a plurality of sensors; a generation unit that generates a spectrogram using the wave data; an extraction unit that extracts a Doppler shift from the spectrogram; a selection unit that selects, as a sensor pair, two of the sensors that satisfy a preset selection condition for the Doppler shift; and an estimation unit that estimates a trajectory of a wave source, which is a source generating the wave, based on a positional relationship between the sensors constituting the sensor pair and a relationship of the Doppler shifts between the two sensors constituting the sensor pair.

In a trajectory estimation method according to an aspect of the present invention, the method, executed by a computer, includes acquiring wave data based on a wave detected by a plurality of sensors, generating a spectrogram using the wave data, extracting a Doppler shift from the spectrogram, selecting, as a sensor pair, two of the sensors that satisfy a preset selection condition for the Doppler shift, and estimating a trajectory of a wave source, which is a source generating the wave, based on a positional relationship between the sensors constituting the sensor pair and a relationship of the Doppler shifts between the two sensors constituting the sensor pair.

In a program according to an aspect of the present invention, the program causes a computer to execute processing of acquiring wave data based on a wave detected by a plurality of sensors; generating a spectrogram using the wave data, extracting a Doppler shift from the spectrogram, selecting, as a sensor pair, two of the sensors that satisfy a preset selection condition for the Doppler shift, and estimating a trajectory of a wave source, which is a source generating the wave, based on a positional relationship between the sensors constituting the sensor pair and a relationship of the Doppler shifts between the two sensors constituting the sensor pair.

Advantageous Effects of Invention

According to the present invention, it is possible to provide a trajectory estimation device and the like capable of estimating a trajectory of a moving wave source.

EXAMPLE EMBODIMENT

Figure 1:
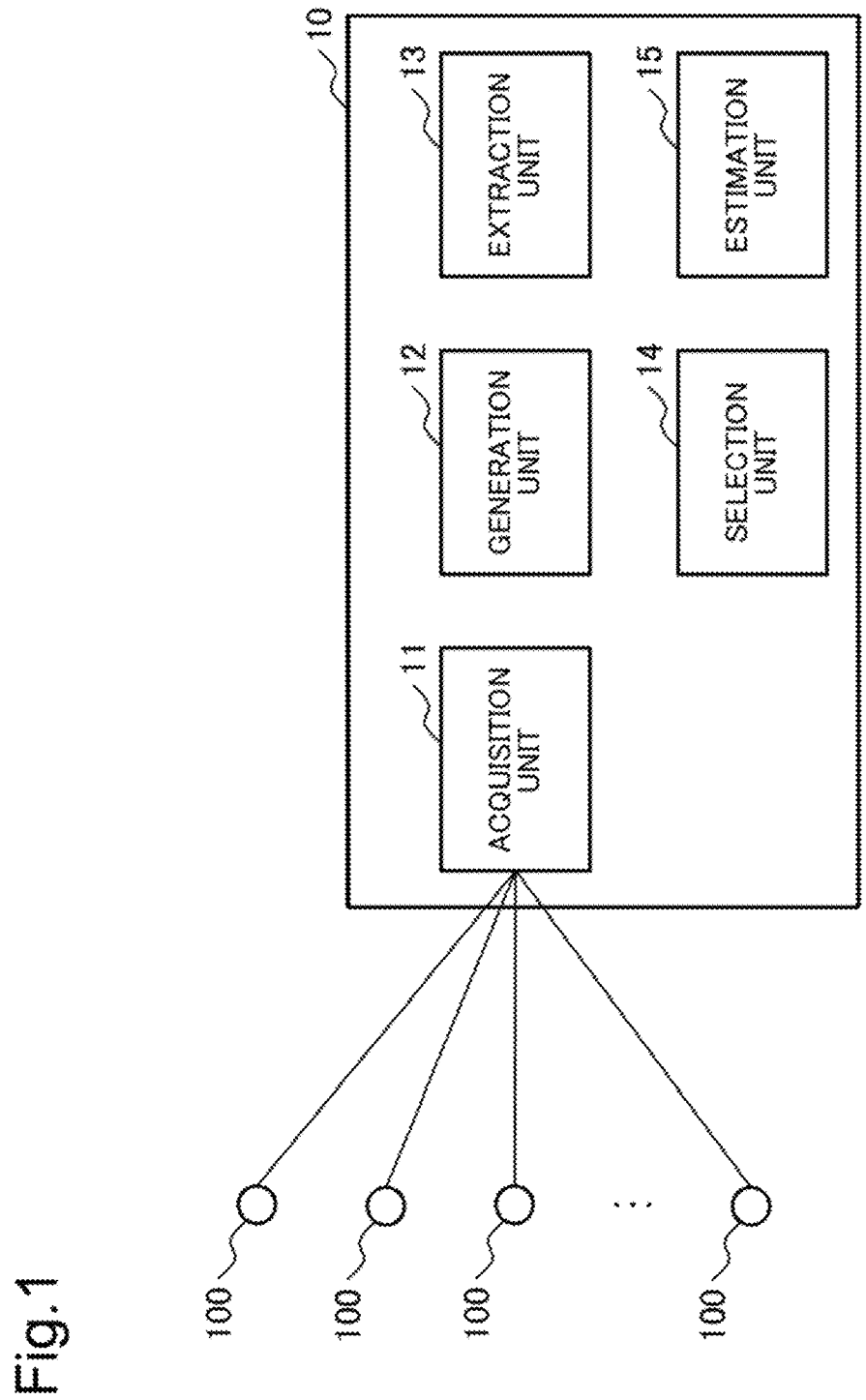
FIG. 1 is a block diagram illustrating an example of a configuration of a trajectory estimation device according to a first example embodiment.

Hereinafter, example embodiments of the present invention will be described with reference to the drawings. However, the example embodiments described below have technically preferable limitations for carrying out the present invention, but the scope of the invention is not limited to the following. In all the drawings used in the following description of the example embodiments, the same reference numerals are given to the same parts unless there is a particular reason. In the following example embodiments, repeated description of similar configurations and operations may be omitted.

First Example Embodiment

First, a trajectory estimation device according to a first example embodiment will be described with reference to the drawings. The trajectory estimation device according to the present example embodiment estimates a temporal change or velocity (hereinafter, referred to as a trajectory) of a position of a moving wave source based on a wave detected by a plurality of sensors. In particular, the trajectory estimation device of the present example embodiment estimates a trajectory of a wave source that performs uniform linear motion. A frequency band of the wave detected by the sensor is assumed to be narrow enough to detect a change due to a Doppler effect. In the present example embodiment, it is assumed that a positive or negative of an angle formed by a straight line passing through two sensors and the trajectory of the wave source is known. When the positive or negative of the angle formed by the straight line passing through the two sensors and the trajectory of the wave source is not known, candidates for the two trajectories are estimated. One of the two estimated trajectories is the trajectory to be estimated.

(Configuration)

FIG. 1 is a block diagram illustrating an example of a configuration of a trajectory estimation device 10 of the present example embodiment. The trajectory estimation device 10 includes an acquisition unit 11, a generation unit 12, an extraction unit 13, a selection unit 14, and an estimation unit 15.

The trajectory estimation device 10 is coupled to a plurality of sensors 100 disposed at intervals. For example, in a case where the wave source of the trajectory to be estimated is a sound source, the sensor 100 can be achieved by a microphone. For example, in a case where the wave source of the trajectory to be estimated is a vibration source, the sensor 100 can be achieved by a vibration sensor. A system including the trajectory estimation device 10 and the plurality of sensors 100 is also referred to as a trajectory estimation system.

The acquisition unit 11 acquires wave data based on the wave detected by the plurality of sensors 100. The acquisition unit 11 outputs the acquired wave data to the generation unit 12. The acquisition unit 11 may be coupled to the plurality of sensors 100 in a wired manner or in a wireless manner. For example, the acquisition unit 11 is coupled to the plurality of sensors 100 via a network (not illustrated).

Figure 2:
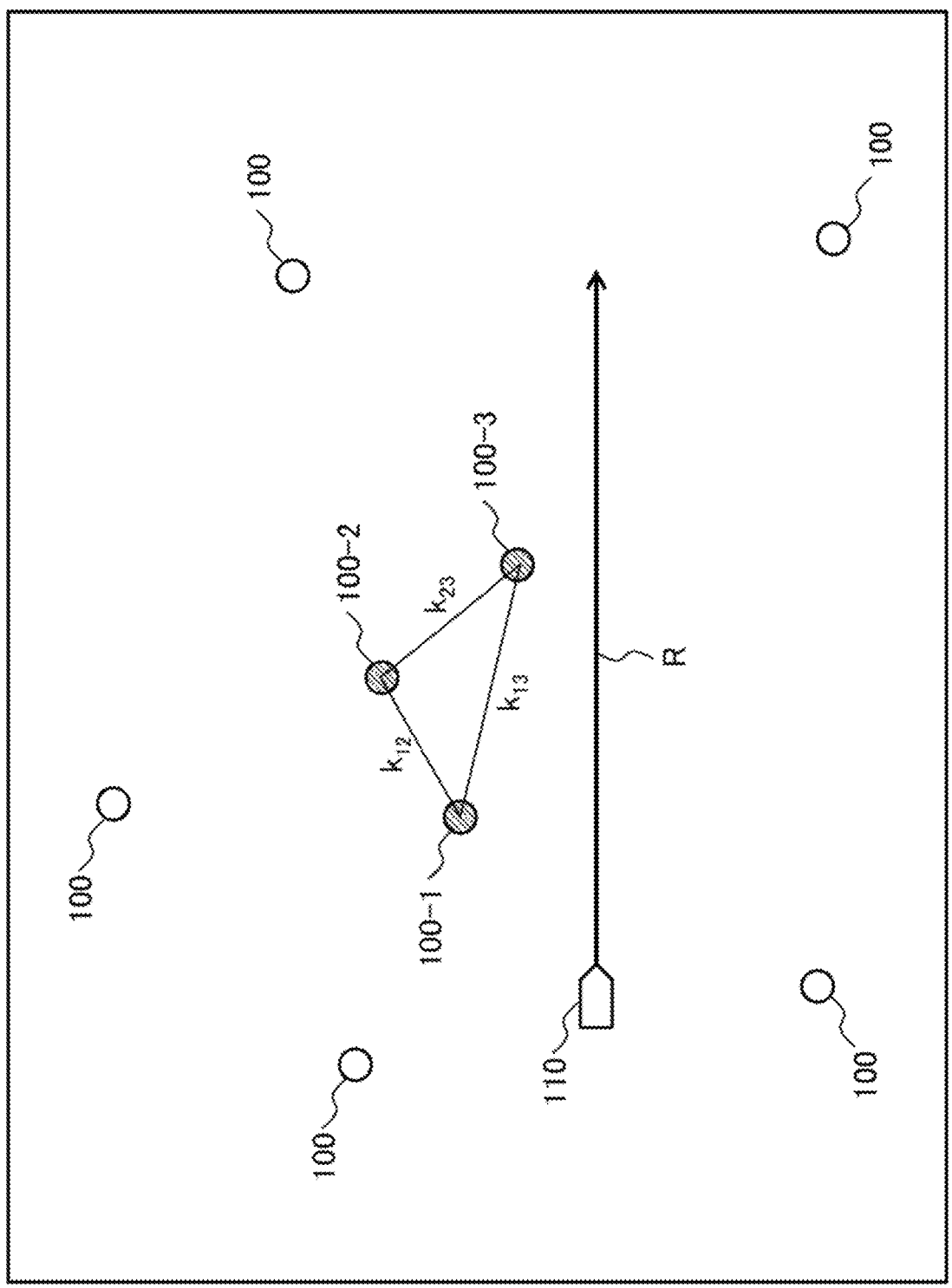
FIG. 2 is a conceptual diagram illustrating a disposition example of a sensor that detects a wave to be estimated by the trajectory estimation device according to the first example embodiment.

FIG. 2 is a conceptual diagram illustrating a disposition example of the plurality of sensors 100. The plurality of sensors 100 are disposed at intervals according to a type of the wave source to be estimated. The plurality of sensors 100 may be disposed in any manner as long as a distance between the sensors 100 can be specified. For example, the plurality of sensors 100 may be disposed at equal intervals or may be disposed at arbitrary intervals. The plurality of sensors 100 may change in positional relationship with each other as long as the distance between the sensors 100 can be determined. For example, a microphone, a vibration sensor, or the like mounted on a mobile terminal that can specify position information by a global positioning system (GPS) or the like may be used as the sensor 100. In the example of FIG. 2, it is assumed that a wave source 110 moves in a space in which the plurality of sensors 100 are disposed in a uniform linear motion along a trajectory R.

Hereinafter, when the individual sensors 100 are distinguished, identification numbers are added to ends of reference numerals of the sensors 100. For example, the sensor 100 having an identification number m is described as a sensor 100-$m$ (m is a natural number). In FIG. 2, the sensors 100 denoted by sensors 100-1 to 100-3 indicate sensors 100 having the identification numbers 1 to 3.

Each of the sensors 100 are disposed at preset intervals. Hereinafter, the interval between the sensor 100-$m$ and a sensor 100-$n$ is denoted as $k_{mn}$ (k is a positive real number, and n is a natural number). The interval between the sensor 100-$m$ and the sensor 100-$n$ may be denoted as $k_{nm}$. In FIG. 2, the interval between the sensor 100-1 and the sensor 100-2 is denoted by $k_{12}$, the interval between the sensor 100-1 and the sensor 100-3 is denoted by $k_{13}$, and the interval between the sensor 100-2 and the sensor 100-3 is denoted by $k_{23}$.

The generation unit 12 acquires the wave data based on the wave detected by the plurality of sensors 100 from the acquisition unit 11. The generation unit 12 generates a spectrogram for each of the plurality of sensors 100 by using the acquired wave data for each of the plurality of sensors 100. The spectrogram is a three-dimensional graph representing the wave detected by each sensor 100 in a relationship of a time, a frequency, an intensity, and the like. In the present example embodiment, in the spectrogram, the time is set on a horizontal axis, the frequency is set on a vertical axis, and the intensity is indicated by shading. The spectrogram represents what kind of frequency component is included and to what extent in the waveform sampled from the wave data. Instead of the intensity, an amplitude or the like may be used.

Figure 3:
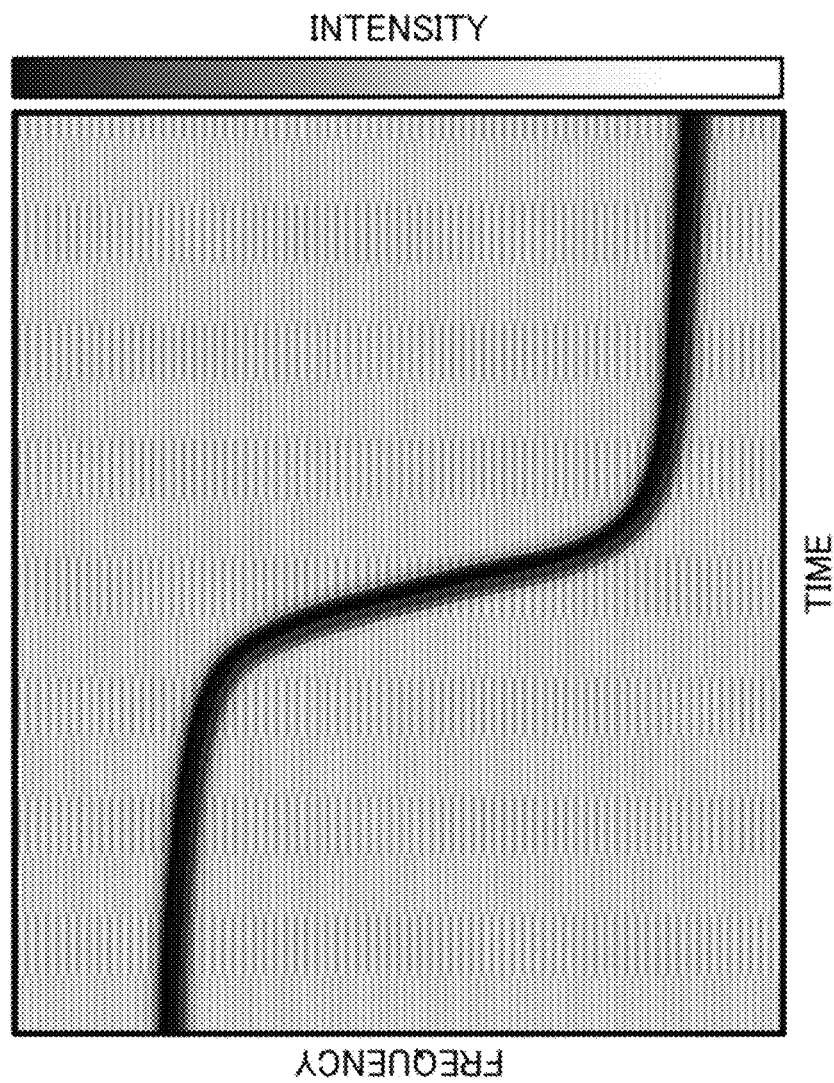
FIG. 3 is an example of a spectrogram generated by a generation unit of the trajectory estimation device according to the first example embodiment.
Figure 4:
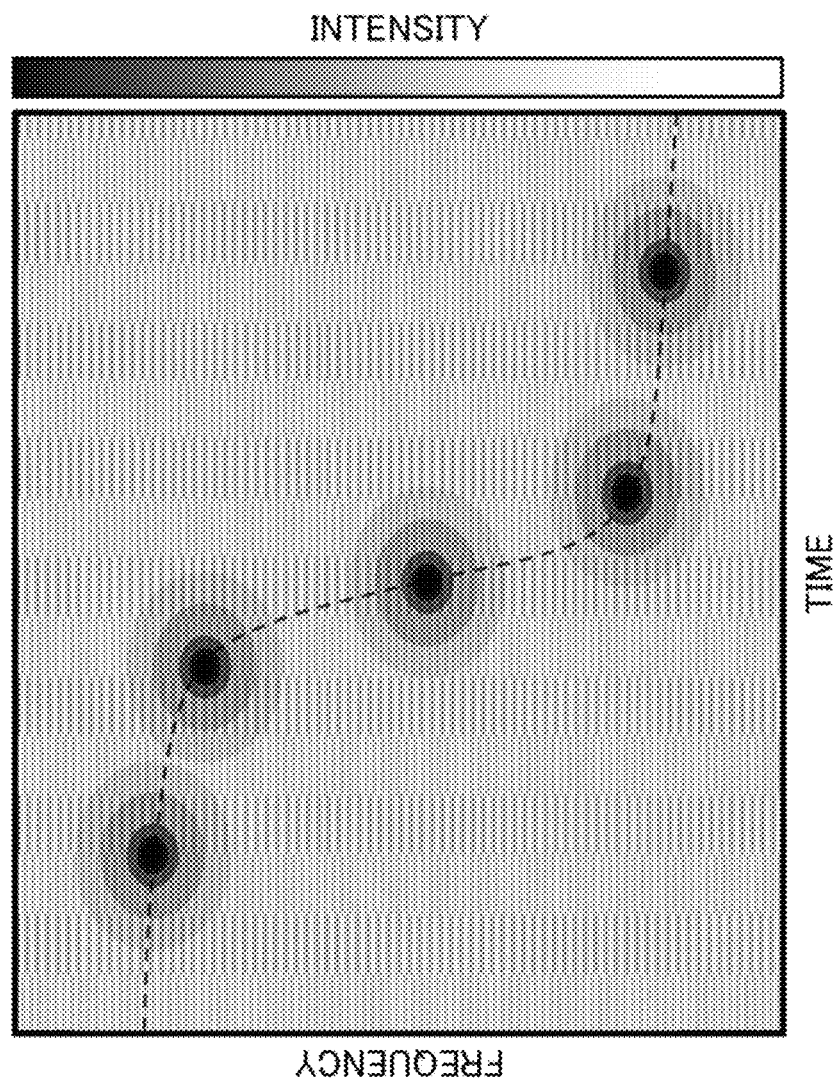
FIG. 4 is another example of a spectrogram generated by the generation unit of the trajectory estimation device according to the first example embodiment.

FIGS. 3 and 4 are examples of the spectrogram generated by the generation unit 12. In FIGS. 3 and 4, the intensity of the wave is represented by shading. In the example of FIG. 3, peaks indicating a maximum or maximum intensity in entire frequency band are continuous. In the example of FIG. 4, the peak indicating the maximum or maximum intensity in the entire frequency band is discrete. However, the examples of FIGS. 3 and 4 conceptually indicate the spectrogram generated by the generation unit 12, and are not generated based on the actually detected wave.

The extraction unit 13 extracts a Doppler shift from the spectrogram generated by the generation unit 12. The Doppler shift is a temporal change of a frequency extracted based on the peak having the maximum or greatest intensity in the spectrogram.

In the case of the example of FIG. 3, the extraction unit 13 extracts a curve along continuous peaks as the Doppler shift. For example, the extraction unit 13 extracts, as the Doppler shift, a trajectory of the peak having the maximum intensity at the same time or the same frequency.

In the case of the example of FIG. 4, the extraction unit 13 extracts a curve obtained by interpolating discrete peaks as the Doppler shift. For example, the extraction unit 13 selects a curve obtained by fitting discrete peaks with a function such as a cubic function as the Doppler shift. In a case where the frequency band of the wave can be assumed from the wave source to some extent, the extraction unit 13 may extract a curve passing through the maximum or greatest peak in the assumed frequency band as the Doppler shift. When the number of peaks is sufficiently large, the extraction unit 13 may connect discrete peaks with line segments.

In a case where the frequency of the wave is known in advance, for example, the extraction unit 13 generates a frequency obtained by shifting the frequency of the wave within a certain frequency width as a basis. For example, it is assumed that the frequency of the wave is f hertz and a constant frequency width is a hertz (f and a are real numbers). In this case, the extraction unit 13 generates frequencies obtained by shifting the frequency (f hertz) of the wave to f$-\alpha$, f$-\alpha+1$, . . . , f, f+1, . . . , f+$\alpha$ within a frequency width of $\pm\alpha$ hertz as bases. The extraction unit 13 derives activations for all these bases by non-negative matrix factorization (NMF), and specifies a basis of which activation takes the maximum value. The extraction unit 13 calculates, as the Doppler shift, a curve obtained by plotting the frequency of the basis at which the activation takes the maximum value for each time. The extraction unit 13 may extract a curve obtained by fitting a temporal change of the specified frequency with a function such as a cubic function as the Doppler shift.

Figure 5:
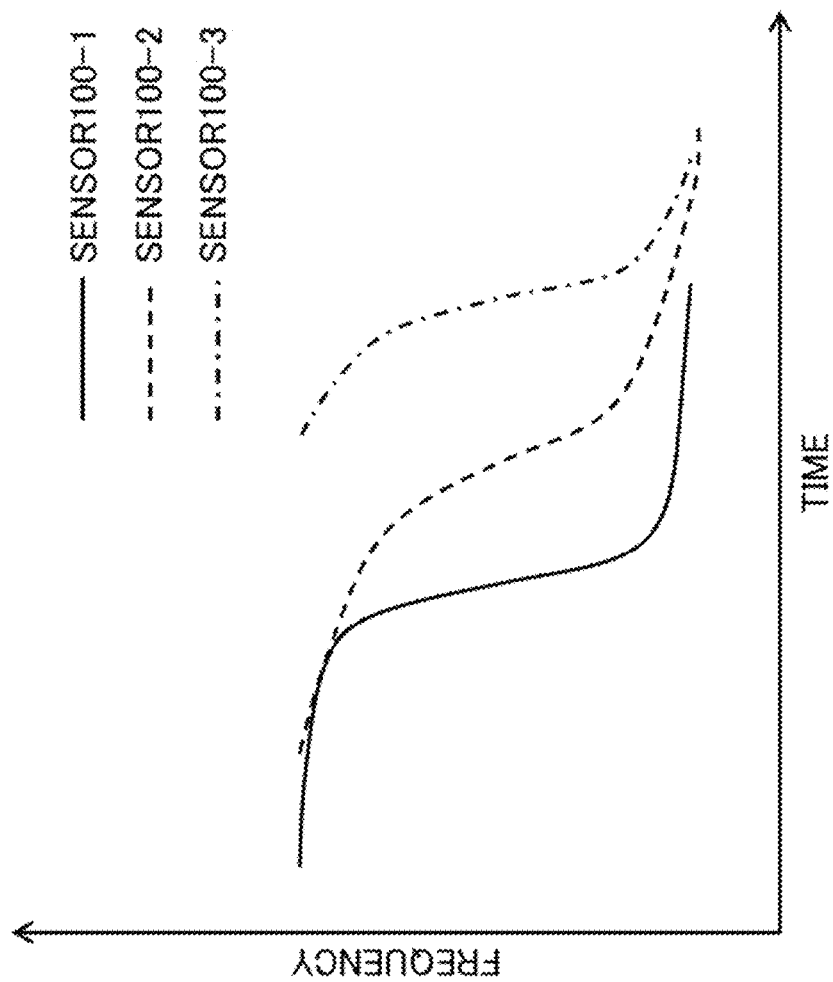
FIG. 5 is a graph illustrating an example of a Doppler shift extracted by an extraction unit of the trajectory estimation device according to the first example embodiment.

FIG. 5 is a graph illustrating an example of the Doppler shift extracted by the extraction unit 13 in a case where there is a single wave source. In FIG. 5, the Doppler shift based on the wave detected by the sensor 100-1 is indicated by a solid line, the Doppler shift based on the wave detected by the sensor 100-2 is indicated by a broken line, and the Doppler shift based on the wave detected by the sensor 100-3 is indicated by a one-dot chain line.

Figure 6:
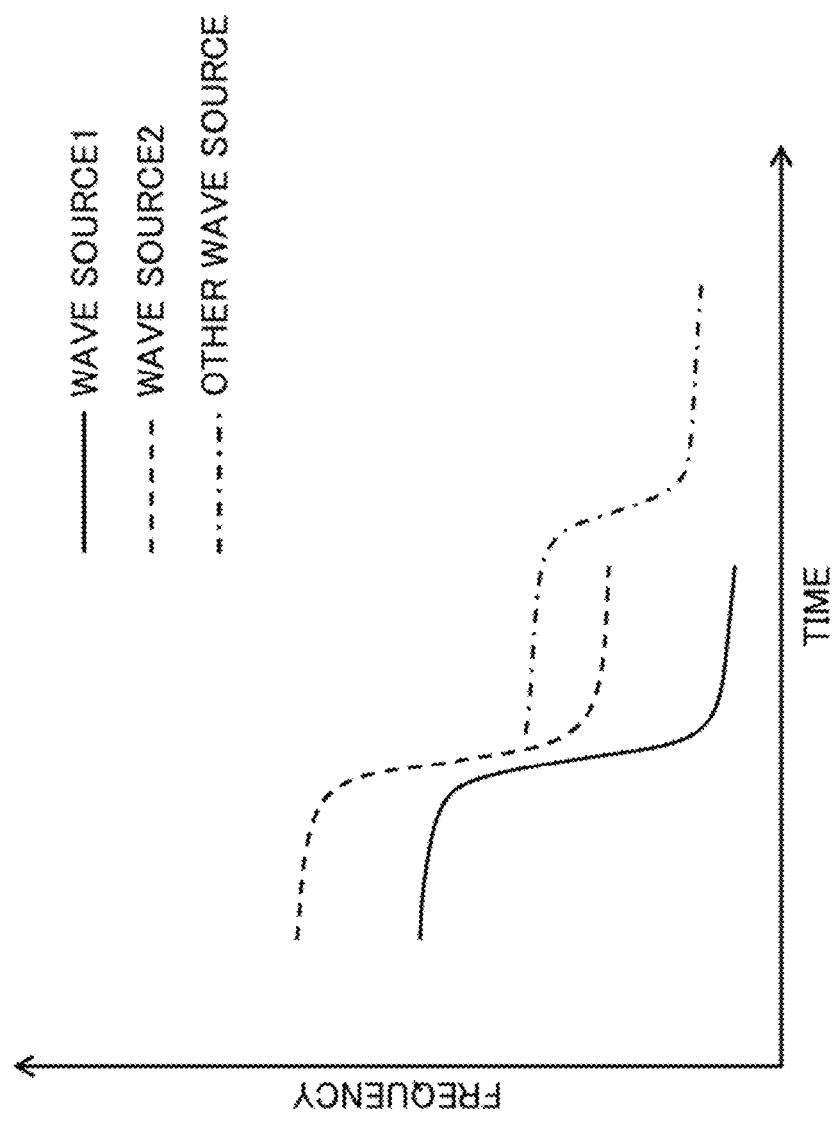
FIG. 6 is a graph illustrating another example of a Doppler shift extracted by the extraction unit of the trajectory estimation device according to the first example embodiment.

FIG. 6 is a graph illustrating an example of the Doppler shift extracted by the extraction unit 13 in a case where the wave from the plurality of wave sources is mixed. When the wave from the plurality of wave sources is mixed, fitting to a function such as the cubic function may be performed, and the Doppler shift may be separated and extracted for each wave source. In FIG. 6, the Doppler shift of a wave source 1 is indicated by a solid line, the Doppler shift of a wave source 2 is indicated by a broken line, and the Doppler shifts of other wave source is indicated by alternate long and short dash line.

The selection unit 14 selects two sensors 100 from among the plurality of sensors 100 based on the relationship of the Doppler shifts of the plurality of sensors 100 extracted by the extraction unit 13. The selection unit 14 sets the two selected sensors 100 as a sensor pair. The selection unit 14 selects two sensors 100 that satisfy a preset selection condition as the sensor pair. The selection condition is a condition for the estimation unit 15 to estimate the trajectory of the wave source using a method to be described later.

Figure 7:
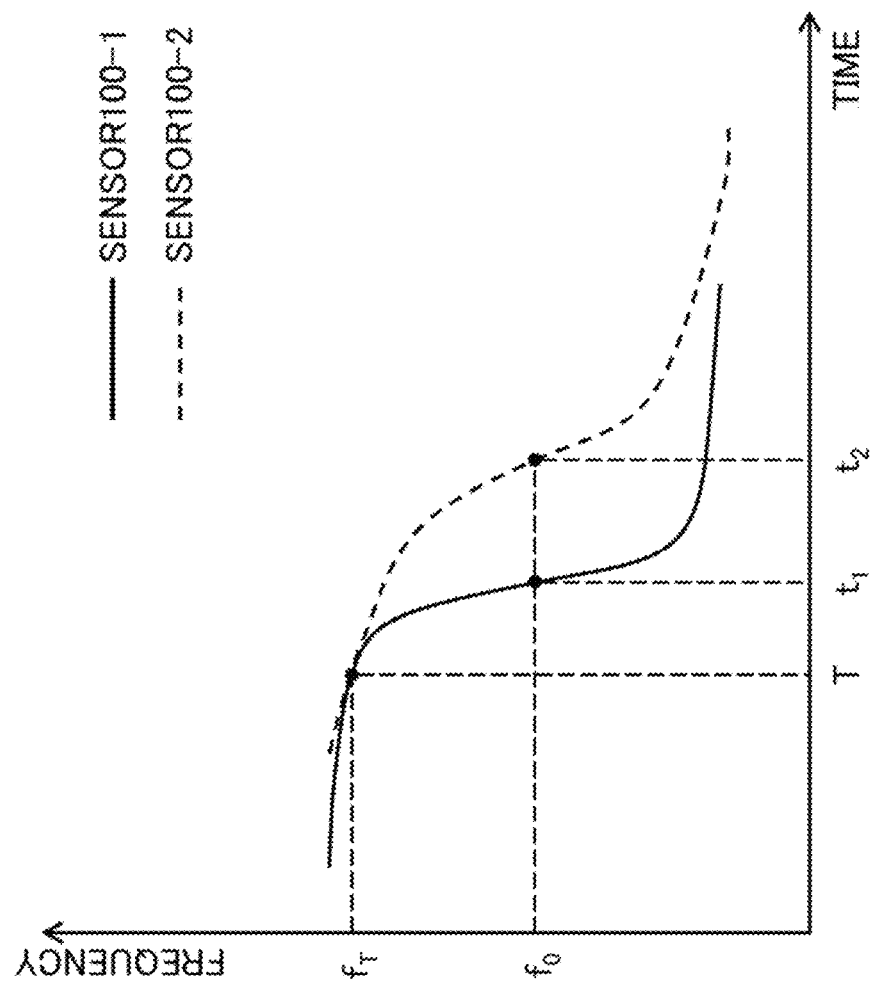
FIG. 7 is a graph for describing a selection condition of a sensor pair selected by a selection unit of the trajectory estimation device according to the first example embodiment.

FIG. 7 is a graph for describing the selection condition of the sensor pair, and illustrates the Doppler shifts of two sensors among the Doppler shifts of the plurality of sensors 100 extracted by the extraction unit 13. The selection condition includes a first condition and a second condition. The first condition is that frequencies of inflection points of Doppler shifts of two sensors 100 are the same or equal to or less than a threshold. The second condition is that Doppler shifts of the two sensors 100 intersect. Both the first condition and the second condition are satisfied when the same wave from the same wave source is detected, a straight line passing through the two sensors 100 and the trajectory of the wave source are not parallel, and the wave source does not pass between the two sensors 100.

In FIG. 7, the Doppler shift of the sensor 100-1 has an inflection point at time $t_1$ (also referred to as a first time). The Doppler shift of the sensor 100-2 has an inflection point at time $t_2$ (also referred to as a second time). The frequencies at the inflection points of the Doppler shifts of the sensor 100-1 and the sensor 100-2 are $f_0$. That is, the Doppler shifts of the sensor 100-1 and the sensor 100-2 have the same frequency ($f_0$) at the inflection point, and the first condition is satisfied. The frequency at the inflection point is not exactly the same, and may include an error that does not significantly affect the estimation of the trajectory of the wave source.

The inflection point of the Doppler shift appears at a timing at which the wave source comes closest to the sensor 100. The frequency of the inflection point of the Doppler shift corresponds to the original frequency $f_0$ of the wave emitted from the wave source. That is, when the first condition is satisfied and the frequencies of the inflection points of the Doppler shifts based on the wave detected by the two sensors 100 are the same, it indicates that the two sensors 100 have detected the same wave emitted from the same wave source.

In practice, there is an error according to the velocity of the wave source between the timing at which the wave source comes closest to the sensor 100 and the timing at which the inflection point of the Doppler shift is observed. Such an error can be ignored unless the velocity of the wave source is extremely fast. For example, when the velocity is about the velocity of an automobile or a ship, an error according to the velocity of the wave source can be ignored. Therefore, in the present example embodiment, such an error is ignored, and it is assumed that the timing at which the wave source comes closest to the sensor 100 and the timing at which the inflection point of the Doppler shift is observed are the same.

In FIG. 7, the Doppler shift of the sensor 100-1 and the Doppler shift of the sensor 100-2 intersect at time T. That is, the Doppler shift of the sensor 100-1 and the Doppler shift of the sensor 100-2 have the same frequency ($f_T$) at time T, and the second condition is satisfied.

When the second condition is satisfied, the straight line passing through the positions of the two sensors 100 and the trajectory of the wave source are not parallel, and the sound source does not pass between the two sensors. When the straight line passing through the positions of the two sensors 100 is not parallel to the trajectory of the wave source, the wave source passes on the straight line passing through the positions of the two sensors 100. The wave emitted from the wave source at the timing at which the wave source passes on the straight line passing through the positions of the two sensors 100 has the same direction of the wave source for the two sensors 100, and is detected as the same frequency $f_0$.

The estimation unit 15 estimates the trajectory of the wave source by using the wave data based on the wave detected by the two sensors 100 (sensor pair) selected by the selection unit 14.

Figure 8:
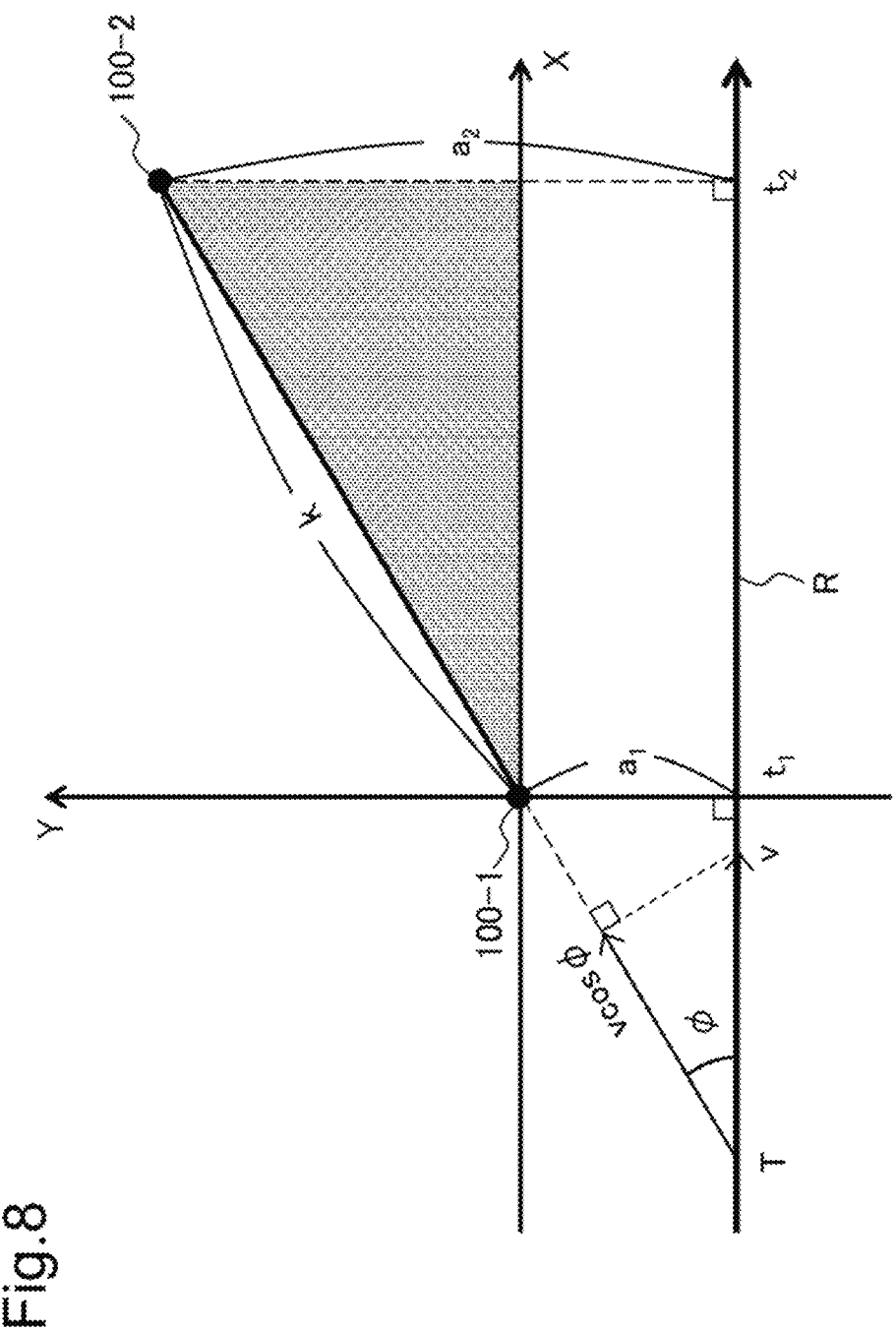
FIG. 8 is a conceptual diagram for describing a method of estimating a trajectory of a wave source by an estimation unit of the trajectory estimation device according to the first example embodiment.

FIG. 8 is a conceptual diagram for describing an example in which the estimation unit 15 estimates the trajectory of the wave source. FIG. 8 is an example in which the sensor 100-1 and the sensor 100-2 are selected as a microphone pair. It is assumed that the wave source performs a uniform linear motion at a velocity v in a direction of an arrow along the trajectory R. It is assumed that the wave source passes through the positions of T, $t_1$, and $t_2$ illustrated in FIG. 8 at each of time T, time $t_1$, and time $t_2$. Time T is a time at which the wave source passes through an intersection of a straight line passing through the sensor 100-1 and the sensor 100-2 and the trajectory R of the wave source. Time $t_1$ is a time at which the sensor 100-1 and the wave source come closest to each other. Time $t_2$ is a time at which the sensor 100-2 and the wave source come closest to each other.

In FIG. 8, the distance between the sensor 100-1 and the wave source at the time when the sensor 100-1 and the wave source come closest to each other is $a_1$. The distance between the sensor 100-2 and the wave source at the time when the sensor 100-2 and the wave source come closest to each other is $a_2$. The distance between the sensor 100-1 and the sensor 100-2 is k. An angle formed by a straight line passing through the sensor 100-1 and the sensor 100-2 and the trajectory R of the wave source is φ. However, in FIG. 8, φ, $a_1$, and $a_2$ have a clockwise direction as positive with a straight line passing through the sensor 100-1 and the sensor 100-2 as 0. In the present example embodiment, it is assumed that the positive or negative of φ is known. Since $a_1$ and $a_2$ are also the same as the sign of φ, it is assumed that the positive or negative is known. The velocity of the wave emitted by the wave source is denoted by V, and the velocity of the wave source is denoted by v. The velocity v of the wave source has a direction from the position at T toward the position at $t_1$ (or the position at $t_2$) as positive. The sign of the velocity v of the wave source is determined by a magnitude relationship among T, $t_1$, and $t_2$.

For example, the estimation unit 15 numerically estimates the trajectory R by using the following Equations 1 to 4.

$$(a_2-a_1)^2+\{v(t_2-t_1)\}^2=k^2 \quad (1)$$

$$v(t_1-T)/a_1=1/\tan\varphi \quad (2)$$

$$v(t_2-T)/a_2=1/\tan\varphi \quad (3)$$

$$f_T/f_0=V/(V-v\cos\varphi) \quad (4)$$

Equation 1 indicates a relationship (three-square theorem) established between lengths of two sides sandwiching a right angle and a length of an oblique side with respect to a right triangle in a hatched portion in FIG. 8. Equation 2 is a relational expression that is established in a triangle having the position of the wave source at time T, the position of the wave source at time $t_1$, and the position of the sensor 100-1 as vertices. Equation 3 is a relational expression that is established in a triangle having the position of the wave at time T, the position of the wave at time $t_2$, and the position of the sensor 100-2 as vertices. Equation 4 is a relational expression relating to the Doppler effect.

For example, the estimation unit 15 calculates the velocity v, a distance $a_1$, a distance $a_2$, and an angle φ by using the above Equations 1 to 4. When the velocity v, the distance $a_1$, the distance $a_2$, and the angle φ are calculated, the trajectory R of the wave source can be estimated based on the known positional relationship between the sensor 100-1 and the sensor 100-2.

Figure 9:
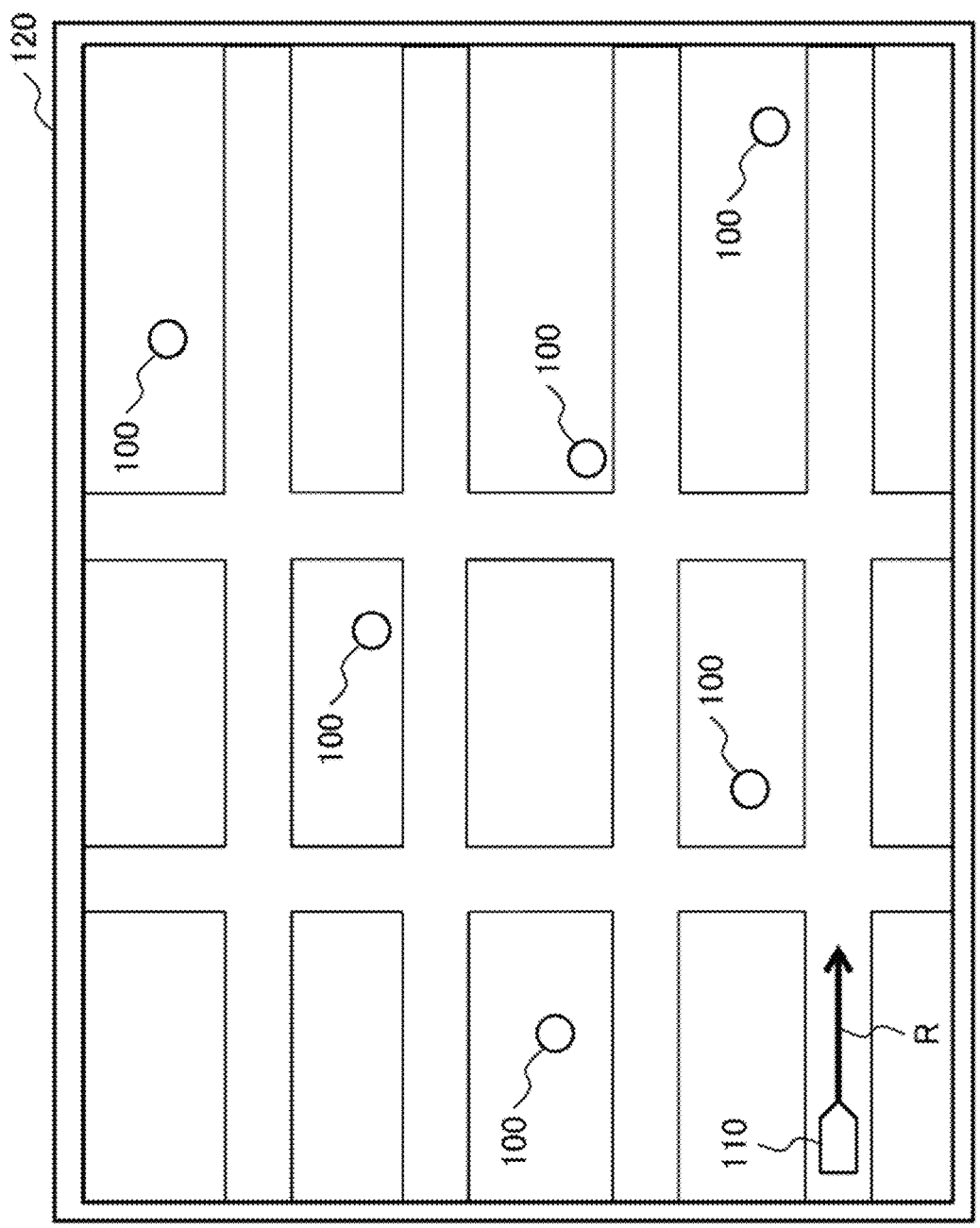
FIG. 9 is a conceptual diagram illustrating an example in which the trajectory of the wave source estimated by the trajectory estimation device according to the first example embodiment is displayed on a screen of a display device.

FIG. 9 is a conceptual diagram illustrating an example in which the trajectory R of the wave source 110 estimated by the trajectory estimation device 10 is displayed on a screen of a display device 120. FIG. 9 is an example in which the wave source 110 such as an automobile or a bicycle moves on a road of a district where a plurality of sensors 100 are disposed. For example, the trajectory R of the wave source 110 is displayed on a map including a path on which the wave source 110 moves. For example, the trajectory R of the wave source 110 is displayed on the route of the wave source 110 according to the type of the wave source 110 such as an automobile or a ship.

(Operation)

Figure 10:
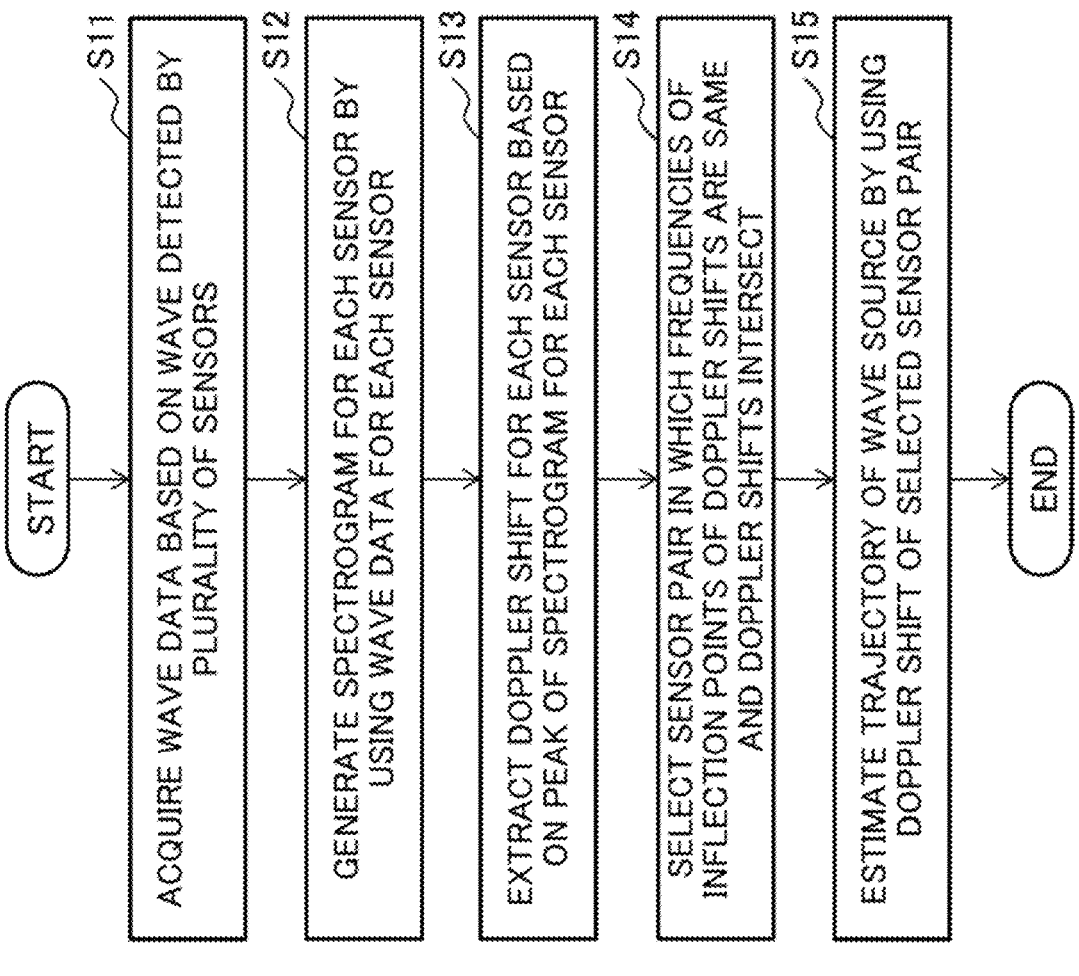
FIG. 10 is a flowchart for describing an operation of the trajectory estimation device according to the first example embodiment.

Next, the operation of the trajectory estimation device 10 of the present example embodiment will be described with reference to the drawings. FIG. 10 is a flowchart for describing the operation of the trajectory estimation device 10. The processing along the flowchart of FIG. 10 will be described with the trajectory estimation device 10 as a subject of the operation.

In FIG. 10, first, the trajectory estimation device 10 acquires wave data based on the wave detected by the plurality of sensors 100 (step S11).

Next, the trajectory estimation device 10 generates a spectrogram for each of the plurality of sensors 100 by using the wave data for each of the plurality of sensors 100 (step S12).

Next, the trajectory estimation device 10 extracts a Doppler shift for each of the plurality of sensors 100 based on a peak of the spectrogram for each of the plurality of sensors 100 (step S13).

Next, the trajectory estimation device 10 selects, as a sensor pair, two sensors 100 in which frequencies of inflection points of the Doppler shifts are the same and the Doppler shifts intersect (step S14).

Next, the trajectory estimation device 10 estimates a trajectory of the wave source by using the Doppler shifts of the selected sensor pair (step S15).

As described above, the trajectory estimation device of the present example embodiment includes the acquisition unit, the generation unit, the extraction unit, the selection unit, and the estimation unit. The acquisition unit acquires wave data based on the wave detected by the plurality of sensors. The generation unit generates a spectrogram by using the wave data. The extraction unit extracts the Doppler shift from the spectrogram. The selection unit selects, as a sensor pair, two sensors that satisfy a preset selection condition for the Doppler shift. The estimation unit estimates the trajectory of the wave source that is a source generating the wave based on a positional relationship between sensors constituting a sensor pair and a relationship of Doppler shifts between two sensors constituting the sensor pair.

The trajectory estimation device of the present example embodiment selects two sensors satisfying the preset selection condition as the sensor pair by using the Doppler shifts extracted based on the wave detected by the plurality of sensors. Then, the trajectory estimation device of the present example embodiment estimates the trajectory of the wave source that is the source generating the wave based on the positional relationship between the sensors constituting the sensor pair and the timing at which the wave is detected by the sensors constituting the sensor pair. Therefore, according to the trajectory estimation device of the present example embodiment, the trajectory of the wave source can be estimated based on the wave from the moving wave source.

In one aspect of the present example embodiment, the selection condition includes the first condition in which the frequencies of the inflection points of the Doppler shifts are same and the second condition in which the Doppler shifts intersect. When the first condition is satisfied and the frequencies of the inflection points of the Doppler shifts based on the wave detected by the two sensors 100 are the same, the same wave emitted from the same wave source is detected by the two sensors. When the second condition is satisfied and the straight line passing through the positions of the two sensors and the trajectory of the wave source are not parallel to each other, a wave having the same frequency emitted from the wave source at the timing at which the wave source passes on the straight line passing through the positions of the two sensors is detected by the two sensors. According to the present aspect, a criterion for selecting the sensor pair for estimating the trajectory of the wave source becomes clear.

In one aspect of the present example embodiment, the extraction unit extracts a curve along continuous peaks in the spectrogram as the Doppler shift. According to the present aspect, when there are continuous peaks in the spectrogram, the Doppler shift can be extracted based on the peaks.

In one aspect of the present example embodiment, the extraction unit extracts a curve obtained by interpolating discrete peaks in the spectrogram as the Doppler shift. According to the present aspect, even when there is no continuous peaks in the spectrogram, the Doppler shift can be extracted based on those peaks.

In an aspect of the present example embodiment, in a case where the frequency of the wave is known, the extraction unit uses a basis based on the known frequency from the spectrogram, and specifies a frequency at which the activation is large by non-negative matrix factorization. The extraction unit extracts a curve connecting the specified frequencies as the Doppler shift. According to the present aspect, when the frequency of the wave is known, the Doppler shift can be extracted even when the peak in the spectrogram is not clear.

In one aspect of the present example embodiment, the estimation unit estimates the trajectory of the wave source based on the relationship between the distance between the two sensors constituting the sensor pair, the first time at which the wave source passes on the straight line passing through the positions of the two sensors and the frequency at the first time, and the second time at which the distance between each of the two sensors and the wave source is the shortest and the frequency at the second time. Specifically, the estimation unit estimates the trajectory of the wave source by calculating the velocity of the wave source, the shortest distance between each of the two sensors and the wave source, and the angle formed by the straight line passing through the positions of the two sensors and the trajectory of the wave source. According to the present aspect, the trajectory of the wave source can be estimated by numerical calculation based on the wave from the moving wave source.

The trajectory estimation system according to one aspect of the present example embodiment includes, in addition to the above-described trajectory estimation device, at least one sensor that detects a wave from a wave source and outputs wave data based on the detected wave to the trajectory estimation device.

For example, in the present example embodiment, when the type of the wave source is a vehicle such as an automobile, a plurality of sensors are disposed at intervals of several tens of meters. The plurality of sensors of the present example embodiment can be configured by a single microphone instead of a microphone array in which a plurality of microphones are disposed in an array. In the method using the microphone array, microphone arrays in which a plurality of microphones are disposed at intervals of several centimeters are disposed at intervals of several tens of meters. On the other hand, in the method of the present example embodiment, a single microphone may be disposed at intervals of several tens of meters. Therefore, according to the present example embodiment, the installation cost of the sensor can be reduced as compared with the case of using the microphone array.

In the method using the microphone array, the position of the wave source is estimated by regarding the position of the wave source at regular time intervals as stationary. As the velocity of the wave source increases, it is necessary to set a time interval (also referred to as a time window) for estimating the wave source direction narrower. However, since the amount of data in the time window decreases, a sufficient amount of data for estimation cannot be obtained, and the estimation accuracy decreases. On the other hand, in the present example embodiment, the trajectory of the wave source is estimated by using the Doppler shift extracted from the spectrogram. Therefore, according to the present example embodiment, the trajectory of the wave source can be estimated with high accuracy.

Second Example Embodiment

Next, a trajectory estimation device according to a second example embodiment will be described with reference to the drawings. The trajectory estimation device according to the present example embodiment selects two or more sensor pairs and estimates the trajectory of the wave source based on the relationship of the Doppler shifts of the two or more selected sensor pairs. In the present example embodiment, the direction of the wave source with respect to the plurality of sensors may not be known.

Figure 11:
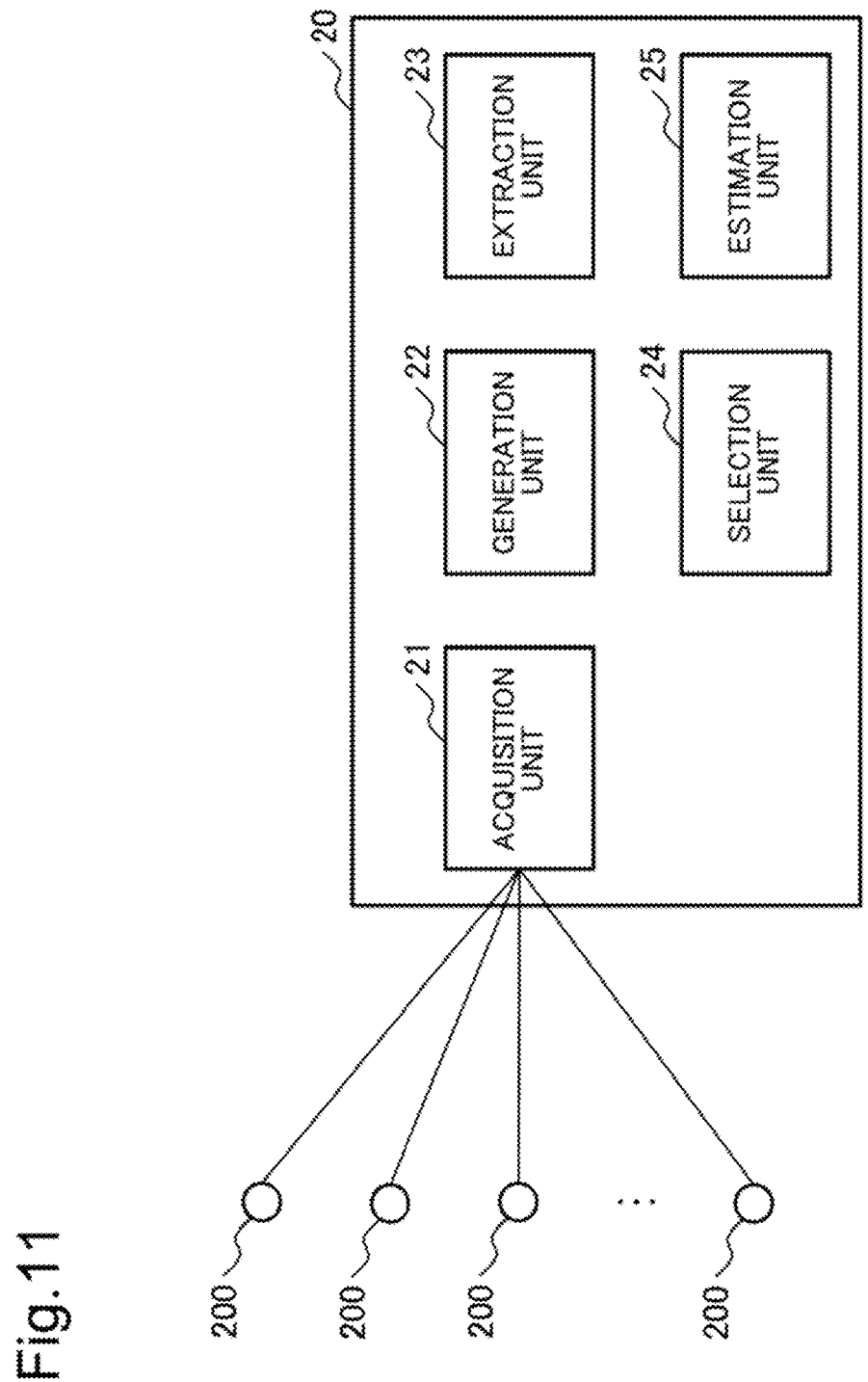
FIG. 11 is a block diagram illustrating an example of a configuration of a trajectory estimation device according to a second example embodiment.

FIG. 11 is a block diagram illustrating an example of a configuration of a trajectory estimation device 20 of the present example embodiment. The trajectory estimation device 20 includes an acquisition unit 21, a generation unit 22, an extraction unit 23, a selection unit 24, and an estimation unit 25.

The trajectory estimation device 20 is coupled to a plurality of sensors 200 disposed at intervals. The trajectory estimation device 20 is substantially similar to the trajectory estimation device 10 of the first example embodiment except that processing of the selection unit 24 and the estimation unit 25 is partially different. Therefore, in the present example embodiment, the description of the same points as those of the first example embodiment will be omitted, and the description will focus on the differences.

Figure 12:
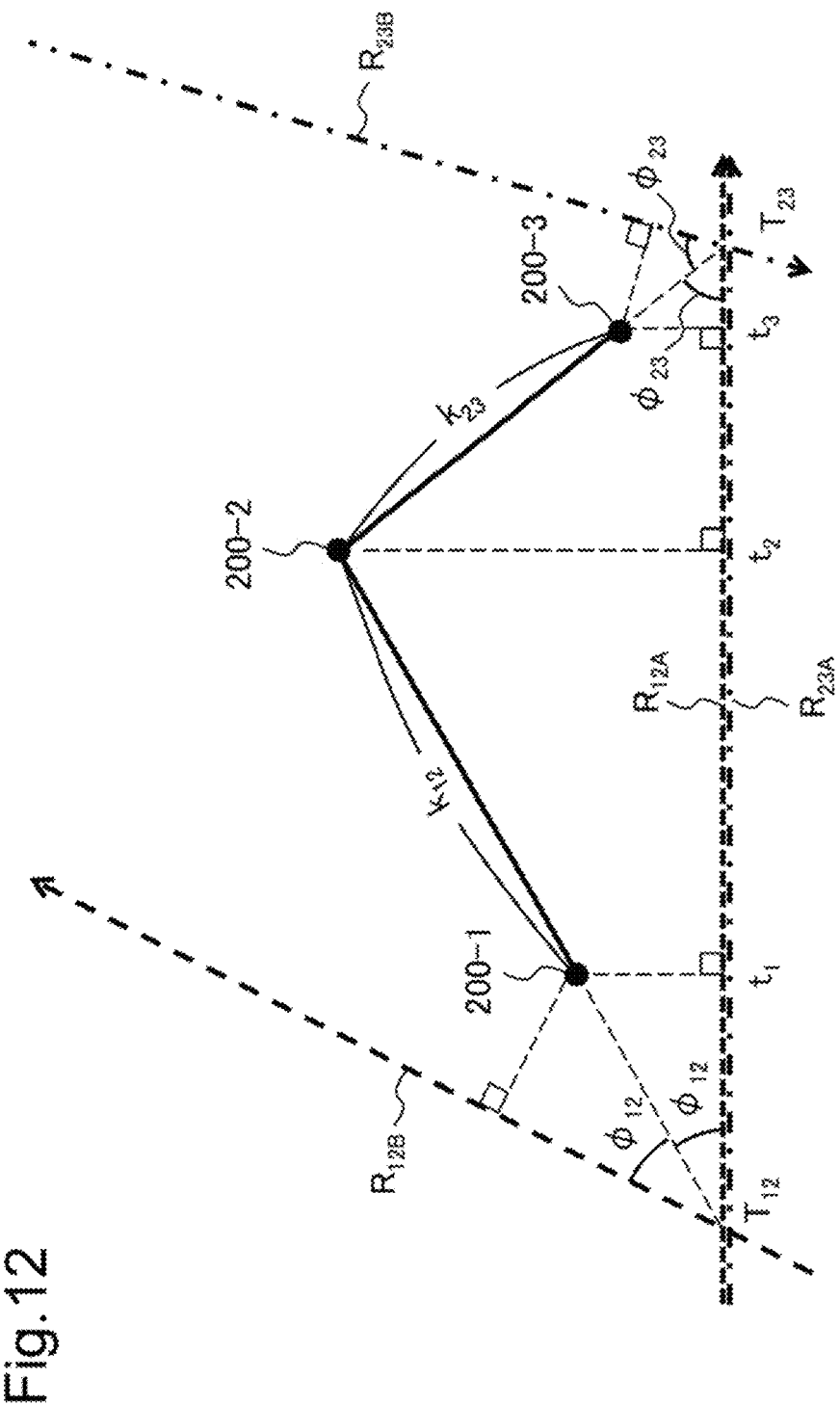
FIG. 12 is a conceptual diagram for describing a method of estimating a trajectory of a wave source by an estimation unit of the trajectory estimation device according to the second example embodiment.

FIG. 12 is a conceptual diagram for describing an example of estimating the trajectory of the wave source based on the relationship of the Doppler shifts of the two sets of sensor pairs selected by the selection unit 24. The selection condition of the sensor pair by the selection unit 24 is similar to that of the first example embodiment.

The selection unit 24 selects a first sensor pair including a sensor 200-1 and a sensor 200-2. An interval between the sensor 200-1 and the sensor 200-2 is $k_{12}$. A timing at which the wave source comes closest to the sensor 200-1 is time $t_1$. A timing at which the wave source comes closest to the sensor 200-2 is time $t_2$. A timing at which a straight line passing through the positions of the sensor 200-1 and the sensor 200-2 intersects the trajectory of the wave source is time $T_{12}$. An angle formed by a straight line passing through the positions of the sensor 200-1 and the sensor 200-2 and the trajectory of the wave source is $\varphi_{12}$.

The selection unit 24 selects a second sensor pair including the sensor 200-2 and the sensor 200-3. An interval between the sensor 200-2 and the sensor 200-3 is $k_{23}$. A timing at which the wave source comes closest to the sensor 200-2 is time $t_2$. A timing at which the wave source comes closest to the sensor 200-3 is time $t_3$. A timing at which a straight line passing through the positions of the sensor 200-2 and the sensor 200-3 intersects the trajectory of the wave source is time $T_{23}$. An angle formed by a straight line passing through the positions of the sensor 200-2 and the sensor 200-3 and the trajectory of the wave source is $\varphi_{23}$.

The estimation unit 25 estimates the trajectory of the wave source for each of the two sensor pairs selected by the selection unit 24. The estimation unit 25 calculates two trajectory candidates for each sensor pair. The two trajectory candidates calculated for each sensor pair have the same angle with a straight line passing through the two sensors 200 constituting the sensor pair, and have different positive or negative sign. In the example of FIG. 12, the estimation unit 25 estimates two trajectory candidates (trajectory candidate $R_{12A}$ and trajectory candidate $R_{12B}$) for the first sensor pair including the sensor 200-1 and the sensor 200-2. The estimation unit 25 estimates trajectory candidates (trajectory candidate $R_{23A}$ and trajectory candidate $R_{23B}$) for the second sensor pair including the sensor 200-2 and the sensor 200-3.

The estimation unit 25 estimates the matching trajectory candidate among the trajectory candidates estimated for each of the first sensor pair and the second sensor pair as the trajectory of the wave source. In the example of FIG. 12, the trajectory candidate $R_{12A}$ estimated for the first sensor pair and the trajectory candidate $R_{23A}$ estimated for the second sensor pair are common. Therefore, the estimation unit 25 estimates these trajectory candidates (trajectory candidate $R_{12A}$ and trajectory candidate $R_{23A}$) as the trajectory of the wave source. The trajectory candidate selected by the first sensor pair and the trajectory candidate selected by the second sensor pair do not always completely match. Therefore, the estimation unit 25 may estimate any one of the most similar trajectory candidates among the trajectory candidate selected by the first sensor pair and the trajectory candidate selected by the second sensor pairs as the trajectory of the wave source. The estimation unit 25 may estimate, as the trajectory of the wave source, an average of the most similar trajectory candidates among the trajectory candidate selected by the first sensor pair and the trajectory candidate selected by the second sensor pairs.

As described above, the selection unit of the trajectory estimation device of the present example embodiment selects at least two sets of sensor pairs. The selection unit estimates the trajectory of the wave source based on a matching trajectory candidate among the trajectory candidates of the wave source estimated for the selected at least two sets of sensor pairs. According to the present example embodiment, even when the direction of the wave source with respect to the sensor is not known, the trajectory of the wave source can be estimated based on the wave from the moving wave source.

In the present example embodiment, an example has been described in which two sets of sensor pairs are selected and the trajectory of the wave is estimated. When two sets of sensor pairs are selected, the trajectory of the wave can be two-dimensionally estimated. Three or more sets of sensor pairs may be selected, and trajectory for which trajectory candidates estimated for all the sensor pairs match (or an average of similar trajectory candidates) may be estimated. In a case where the trajectory of the wave is three-dimensionally estimated, three or more sets of sensor pairs may be selected.

Third Example Embodiment

Next, a trajectory estimation device according to a third example embodiment will be described with reference to the drawings. The trajectory estimation device of the present example embodiment has a simplified configuration of the trajectory estimation devices according to the first and second example embodiments.

Figure 13:
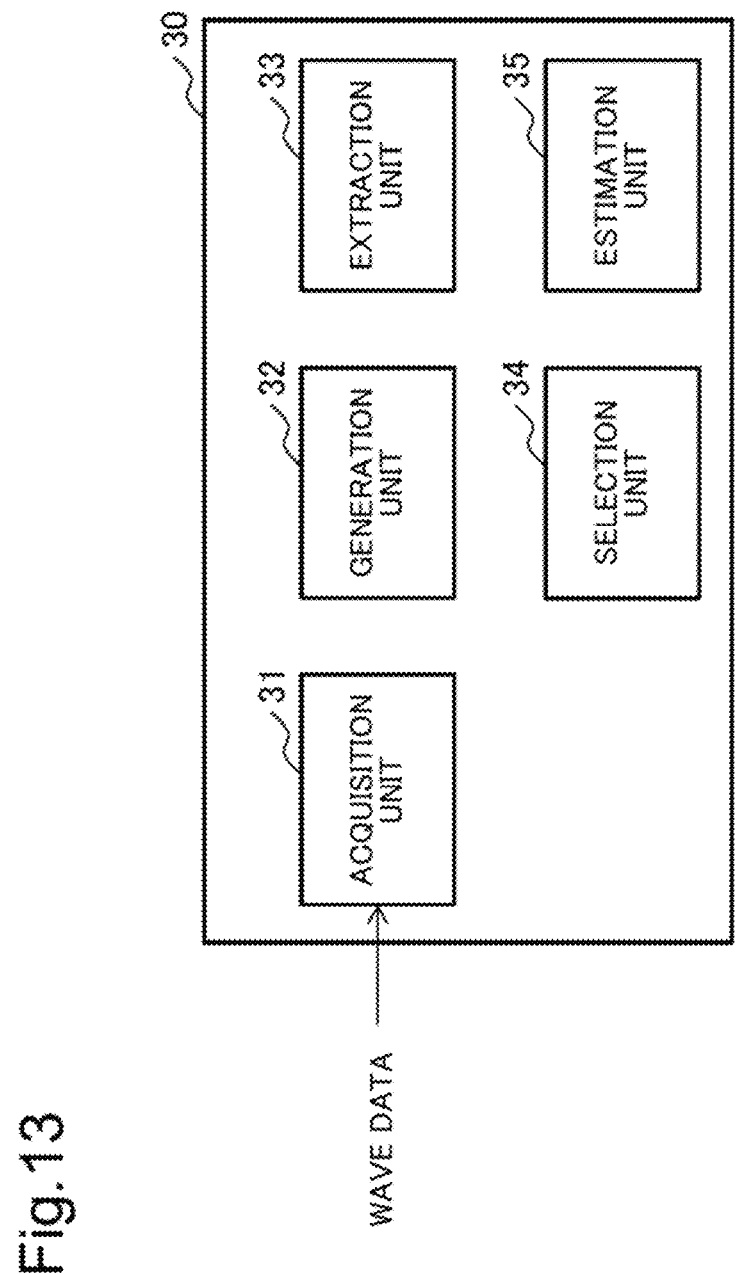
FIG. 13 is a block diagram illustrating an example of a configuration of a trajectory estimation device according to a third example embodiment.

FIG. 13 is a block diagram illustrating an example of a configuration of a trajectory estimation device 30 of the present example embodiment. The trajectory estimation device 30 includes an acquisition unit 31, a generation unit 32, an extraction unit 33, a selection unit 34, and an estimation unit 35. As an example, each component included in the trajectory estimation device 30 is similar to that of the trajectory estimation device 10 of the first example embodiment or the trajectory estimation device 20 of the second example embodiment.

The acquisition unit 31 acquires wave data based on the wave detected by the plurality of sensors. The generation unit 32 generates a spectrogram by using the wave data. The extraction unit 33 extracts the Doppler shift from the spectrogram. The selection unit 34 selects, as a sensor pair, two sensors that satisfy a preset selection condition for the Doppler shift. The estimation unit 35 estimates the trajectory of the wave source that is the source generating the wave based on the positional relationship between the sensors constituting the sensor pair and the timing at which the wave is detected by the sensors constituting the sensor pair.

As described above, the trajectory estimation device of the present example embodiment selects two sensors satisfying the preset selection condition as the sensor pair by using the Doppler shift extracted based on the wave detected by the plurality of sensors. Then, the trajectory estimation device of the present example embodiment estimates the trajectory of the wave source that is the source generating the wave based on the positional relationship between the sensors constituting the sensor pair and the timing at which the wave is detected by the sensors constituting the sensor pair. Therefore, according to the trajectory estimation device of the present example embodiment, the trajectory of the wave source can be estimated based on the wave from the moving wave source.

(Hardware)

Here, a hardware configuration for executing the processing of the trajectory estimation device according to each example embodiment will be described by using an information processing device 90 of FIG. 14 as an example. The information processing device 90 in FIG. 14 is a configuration example for executing processing of the trajectory estimation device of each example embodiment, and does not limit the scope of the present invention.

Figure 14:
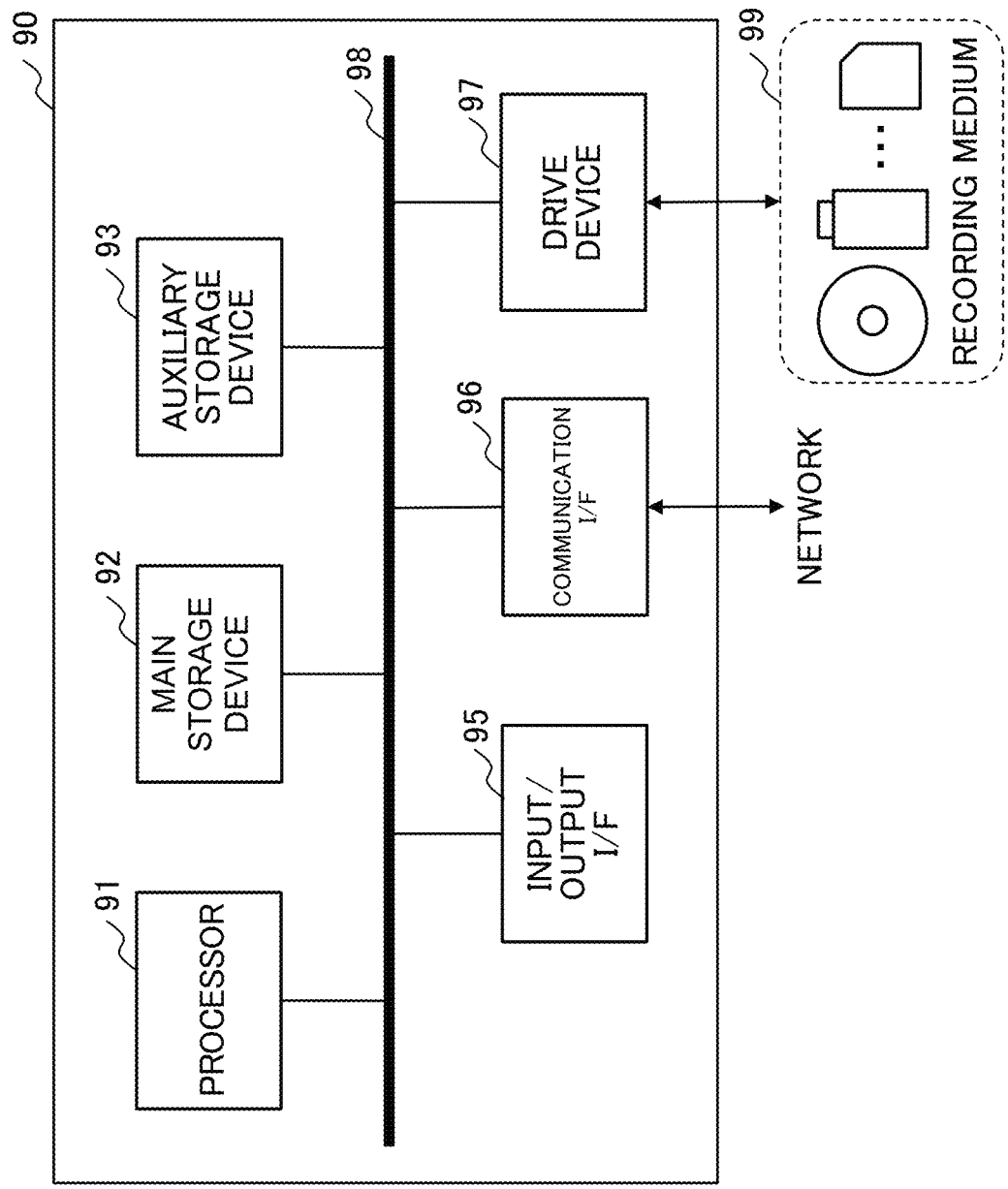
FIG. 14 is a conceptual diagram illustrating an example of a hardware configuration for achieving a trajectory estimation device according to each example embodiment.

As illustrated in FIG. 14, the information processing device 90 includes a processor 91, a main storage device 92, an auxiliary storage device 93, an input/output interface 95, a communication interface 96, and a drive device 97. In FIG. 14, the interface is abbreviated as an I/F (interface). The processor 91, the main storage device 92, the auxiliary storage device 93, the input/output interface 95, the communication interface 96, and the drive device 97 are datacommunicably coupled to each other via a bus 98. The processor 91, the main storage device 92, the auxiliary storage device 93, and the input/output interface 95 are coupled to a network such as the Internet or an intranet via the communication interface 96. FIG. 14 illustrates a recording medium 99 capable of recording data.

The processor 91 develops the program stored in the auxiliary storage device 93 or the like in the main storage device 92 and executes the developed program. In the present example embodiment, a software program installed in the information processing device 90 may be used. The processor 91 executes processing by the trajectory estimation device according to the present example embodiment.

The main storage device 92 has an area in which a program is developed. The main storage device 92 may be a volatile memory such as a dynamic random access memory (DRAM). A nonvolatile memory such as a magnetoresistive random access memory (MRAM) may be configured and added as the main storage device 92.

The auxiliary storage device 93 stores various kinds of data. The auxiliary storage device 93 includes a local disk such as a hard disk or a flash memory. The various kinds of data may be stored in the main storage device 92, and the auxiliary storage device 93 may be omitted.

The input/output interface 95 is an interface for coupling the information processing device 90 to a peripheral device. The communication interface 96 is an interface for coupling to an external system or device through a network such as the Internet or an intranet based on a standard or a specification. The input/output interface 95 and the communication interface 96 may be shared as an interface coupled to the external device.

An input device such as a keyboard, a mouse, or a touch panel may be coupled to the information processing device 90 as necessary. These input devices are used to input information and settings. When the touch panel is used as the input device, a display screen of a display device may also serve as the interface of the input device. Data communication between the processor 91 and the input device may be mediated by the input/output interface 95.

The information processing device 90 may be provided with a display device for displaying information. In a case where the display device is provided, the information processing device 90 preferably includes a display control device (not illustrated) for controlling display of the display device. The display device may be coupled to the information processing device 90 via the input/output interface 95.

The drive device 97 is coupled to the bus 98. The drive device 97 mediates reading of data and a program from the recording medium 99, writing of a processing result of the information processing device 90 to the recording medium 99, and the like between the processor 91 and the recording medium 99 (program recording medium). When the recording medium 99 is not used, the drive device 97 may be omitted.

The recording medium 99 can be achieved by, for example, an optical recording medium such as a compact disc (CD) or a digital versatile disc (DVD). The recording medium 99 may be achieved by a semiconductor recording medium such as a universal serial bus (USB) memory or a secure digital (SD) card, a magnetic recording medium such as a flexible disk, or another recording medium. In a case where the program executed by the processor is recorded in the recording medium 99, the recording medium 99 corresponds to a program recording medium.

The above is the example of the hardware configuration for enabling the trajectory estimation device according to each example embodiment. The hardware configuration of FIG. 14 is an example of a hardware configuration for executing arithmetic processing of the trajectory estimation device according to each example embodiment, and does not limit the scope of the present invention. A program for causing a computer to execute processing related to the trajectory estimation device according to each example embodiment is also included in the scope of the present invention. Further, a program recording medium in which the program according to each example embodiment is recorded is also included in the scope of the present invention.

The components of the trajectory estimation device of each example embodiment can be arbitrarily combined. The components of the trajectory estimation device of each example embodiment may be achieved by software or may be achieved by a circuit.

Although the present invention has been described with reference to the example embodiments, the present invention is not limited to the above example embodiments. Various modifications that can be understood by those of ordinary skill in the art can be made to the configuration and details of the present invention within the scope of the present invention.

REFERENCE SIGNS LIST 10, 20, 30 trajectory estimation device
11, 21, 31 acquisition unit
12, 22, 32 generation unit
13, 23, 33 extraction unit
14, 24, 34 selection unit
15, 25, 35 estimation unit
100, 200 sensor
110 wave source

The invention claimed is:

1. A trajectory estimation device comprising:
at least one memory storing instructions; and
at least one processor connected to the at least one memory and configured to execute the instructions to:
acquire wave data based on a wave detected by each of a plurality of sensors disposed at intervals according to a type of a wave source to be estimated;
generate a spectrogram using the wave data, the spectrogram being a three-dimensional graph representing the wave detected by each of the plurality of sensor in a relationship of a time, a frequency, and an intensity;
extract Doppler shifts from the spectrogram, the Doppler shifts being temporal changes of frequencies extracted based on a peak having a maximum or greatest intensity in the spectrogram;
select, as a sensor pair, two of the sensors that satisfy a preset selection condition for the Doppler shifts; and
estimate a trajectory of the wave source, which is a source generating the wave, based on a positional relationship between the sensors constituting the sensor pair and a relationship of the Doppler shifts between the two sensors constituting the sensor pair, wherein
in a case where a frequency of the wave is known in advance, the at least one processor is configured to execute the instructions to:
generate a plurality of bases by shifting the frequency of the wave within a certain frequency width;
derive activation for the plurality of bases by non-negative matrix factorization;
specify a basis for which the activation has a maximum value, among the plurality of bases; and
calculate, as the Doppler shifts, curves obtained by plotting the frequency of the basis at which the activation has the maximum value.

2. The trajectory estimation device according to claim 1, wherein
the preset selection condition includes a first condition in which frequencies of inflection points of the Doppler shifts are same, and a second condition in which the Doppler shifts intersect.

3. The trajectory estimation device according to claim 1, wherein
the at least one processor is configured to execute the instructions to
extract curves along continuous peaks in the spectrogram as the Doppler shifts.

4. The trajectory estimation device according to claim 1, wherein
the at least one processor is configured to execute the instructions to
extract curves obtained by interpolating discrete peaks in the spectrogram as the Doppler shifts.

5. The trajectory estimation device according to claim 1, wherein
the at least one processor is configured to execute the instructions to
estimate the trajectory of the wave source by calculating a velocity of the wave source, a shortest distance between each of the two sensors constituting the sensor pair and the wave source, and an angle formed by a straight line passing through positions of the two sensors constituting the sensor pair and the trajectory of the wave source;
based on a relationship between a distance between the two sensors constituting the sensor pair, a time at which the wave source passes on the straight line passing through the positions of the two sensors constituting the sensor pair, a first time at which a distance between a first sensor of the two sensors constituting the sensor pair and the wave source is shortest, a frequency at the first time, a second time at which a distance between a second sensor of the two sensors constituting the sensor pair and the wave source is shortest, and a frequency at the second time.

6. The trajectory estimation device according to claim 1, wherein
the at least one processor is configured to execute the instructions to
select at least two sets of the sensor pairs, and
estimate the trajectory of the wave source based on a matching trajectory candidate among trajectory candidates of the wave source estimated for the at least two sets of the sensor pairs that have been selected.

7. A trajectory estimation system comprising:
the trajectory estimation device according to claim 1; and
the plurality of sensors.

8. A trajectory estimation method performed by a computer and comprising:
acquiring wave data based on a wave detected by each of a plurality of sensors disposed at intervals according to a type of a wave source to be estimated;
generating a spectrogram using the wave data, the spectrogram being a three-dimensional graph representing the wave detected by each of the plurality of sensor in a relationship of a time, a frequency, and an intensity;
extracting Doppler shifts from the spectrogram, the Doppler shifts being temporal changes of frequencies extracted based on a peak having a maximum or greatest intensity in the spectrogram;
selecting, as a sensor pair, two of the sensors that satisfy a preset selection condition for the Doppler shifts; and
estimating a trajectory of the wave source, which is a source generating the wave, based on a positional relationship between the sensors constituting the sensor pair and a relationship of the Doppler shifts between the two sensors constituting the sensor pair, wherein
in a case where a frequency of the wave is known in advance.
generating a plurality of bases by shifting the frequency of the wave within a certain frequency width;
deriving activation for the plurality of bases by non-negative matrix factorization;
specifying a basis for which the activation has a maximum value, among the plurality of bases; and
calculating, as the Doppler shifts, curves obtained by plotting the frequency of the basis at which the activation has the maximum value.

9. A non-transitory program recording medium storing a program executable by a computer to perform processing comprising:
acquiring wave data based on a wave detected by each of a plurality of sensors disposed at intervals according to a type of a wave source to be estimated;

generating a spectrogram using the wave data, the spectrogram being a three-dimensional graph representing the wave detected by each of the plurality of sensor in a relationship of a time, a frequency, and an intensity;

extracting Doppler shifts from the spectrogram, the Doppler shifts being temporal changes of frequencies extracted based on a peak having a maximum or greatest intensity in the spectrogram;

selecting, as a sensor pair, two of the sensors that satisfy a preset selection condition for the Doppler shifts; and estimating a trajectory of the wave source, which is a source generating the wave, based on a positional relationship between the sensors constituting the sensor pair and a relationship of the Doppler shifts between the two sensors constituting the sensor pair, wherein in a case where a frequency of the wave is known in advance, generating a plurality of bases by shifting the frequency of the wave within a certain frequency width;

deriving activation for the plurality of bases by non-negative matrix factorization;

specifying a basis for which the activation has a maximum value, among the plurality of bases; and calculating, as the Doppler shifts, curves obtained by plotting the frequency of the basis at which the activation has the maximum value.

\* \* \* \* \*